United States Patent

[11] 3,538,888

| [72] | Inventor | Reuben Fred Speshyock<br>3221 Mills Ave., La Crescenta, California 91214 |
|---|---|---|
| [21] | Appl. No. | 742,742 |
| [22] | Filed | July 5, 1968 |
| [45] | Patented | Nov. 10, 1970 |

[54] FISH CARE AND HANDLING MEDIA
4 Claims, 5 Drawing Figs.

[52] U.S. Cl. ..................................................... 119/5
[51] Int. Cl. .................................................... A01k 63/00
[50] Field of Search ............................................ 119/5, 3; 43/56; 63/18, 1/(B)

[56] References Cited
UNITED STATES PATENTS

| 2,783,736 | 3/1957 | Washburn ..................... | 119/5 |
| 2,927,394 | 3/1960 | Johnson ........................ | 43/56 |
| 3,145,500 | 8/1964 | French et al. ................. | 43/56X |

*Primary Examiner*—Hugh R. Chamblee
*Attorney*—Joseph R. Dwyer

ABSTRACT: Disclosed herein is a fish care and handling media comprising an ornamental necklace for displaying a small, live and swimming, fish, such as a guppy, including a clear, hollow, substantially spherical bowl with a relatively large opening and a breathing tower which cooperates therewith to permit air to freely enter the bowl. The breathing tower connects the necklace bowl to a necklace chain and is provided with a snap-on, snap-off connection to the necklace bowl which also functions to permit the air to enter the necklace bowl as aforesaid through small controlled openings which, at the same time, will not permit water leakage.

The fish care and handling media also includes a funnel-shaped plastic apertured net provided with a manually operable closure plug which enables the user to net a fish from an aquarium and to easily insert it into the necklace bowl without touching the fish and without diluting or mixing the water, if need be.

Patented Nov. 10, 1970
3,538,888
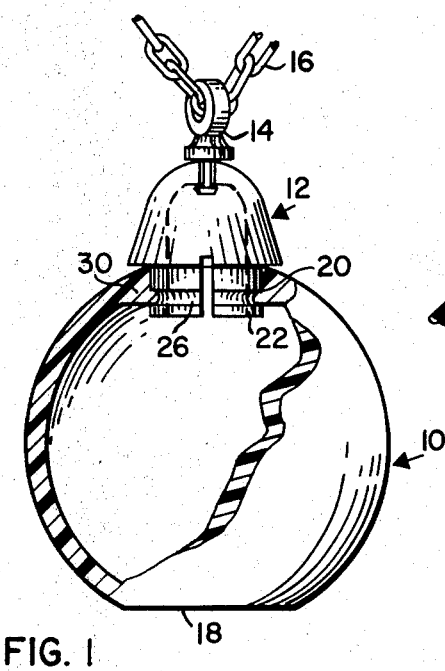
FIG. 1
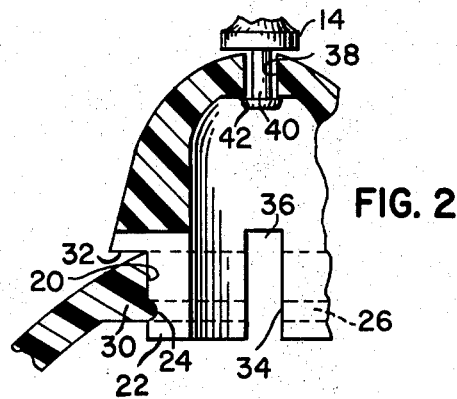
FIG. 2
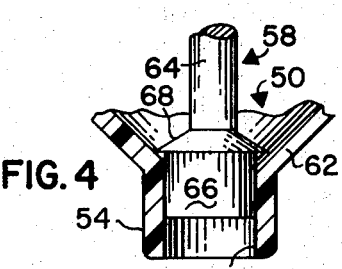
FIG. 4
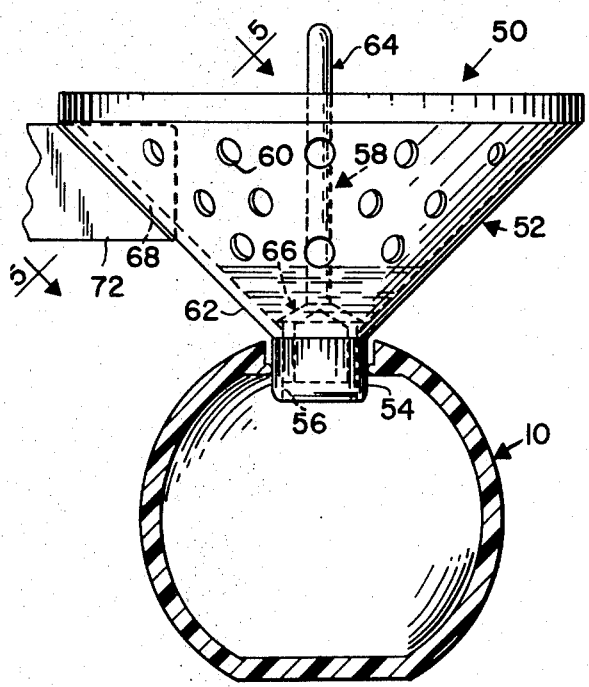
FIG. 3
FIG. 5
INVENTOR:
REUBEN FRED SPESHYOCK
BY
ATTORNEY

FISH CARE AND HANDLING MEDIA

BACKGROUND

While there have been no prior known attempts to provide a complete care and handling media by which a fish can be cared for, handled and displayed without injury to the fish, there have been prior attempts to provide a necklace in which a fish could be contained and displayed within a small bowl. Such prior attempts utilized a thin walled glass bowl of a Christmas type ornament with a small, narrow neck to which was attached a relatively small clasp fitting over the outer rim thereof. To this clasp was attached a necklace chain. The basic problems with such prior art arrangements were:

1. The glass bowl was not suitable for its purpose inasmuch as it was designed for use as a Christmas ornament,
2. Air could not freely enter the bowl,
3. Water and fish could not be removed from the bowl without shaking because of its small neck,
4. Fish to be inserted or removed had to be grasped by hand and, because of their slipperiness, held quite tightly, thus often killing the fish, and
5. The bowl could not stand on any flat surface and therefore was difficult to handle.

SUMMARY

This fish care and handling media which comprises the invention is a substantially spherical plastic bowl with a flat bottom area and provided with a large opening at its top area. The opening is provided with a rim, or bead, which cooperates with a bell shaped breathing tower. A groove on the breathing tower, when inserted with the opening, cooperates to form a snap-on, snap-off attachment between the breathing tower and the bowl. The breathing tower is also provided with longitudinal slots on one end thereof which form part of the attaching means and, when inserted into the bowl opening, these longitudinal slots are long enough to extend beyond the outside wall of the bowl and thus provide an air communication to the inside of the bowl. This air communication is in the form of an opening small enough for air but not large enough to permit water to flow out. These slots have the additional function of enabling the tower's removal from the injection molding device in which the tower is made. The breathing tower is also provided at its top end with a swivel type clasp to permit the same to be attached to a chain or string to form a necklace.

The net which is used in cooperation with the necklace as part of the bowl, comprises a perforated funnel provided with a detachable handle and a manually operable closure plug for opening and closing the funnel opening. The perforations in the sidewalls of the net are located near the top so that a certain amount of water can be retained in the net to enable a fish to be contained without being physically removed from water as it is transported between the aquarium and the necklace. The size of the tube of the funnel is such that it can be inserted in the opening in the bowl.

In operation the closure plug is inserted in the net to block water and fish from flowing out through its depending tube. The tube is inserted in the opening of the bowl just after tipping out the remaining water so that the fish only can be easily inserted into the bowl.

The net and closure plug are also used for the process of changing the water in the necklace bowl. Inasmuch as the holes in the net are set to a height so as to not allow all the water to drain away when the water and fish from the necklace bowl are emptied into it for changing the water, a minimum amount of water is provided to enable the fish to survive. However, since often the necklace bowl is to be colored with a food dye to suit the wearer's apparel, frequent changing of the water occurs and, by tipping the net, the previously colored water can momentarily be drained off and the fish only dropped into the bowl having another color of water without diluting or mixing colors. It is important to note that this changing of the water can be accomplished without having to handle the fish at any time to make a complete fish handling media.

From the foregoing, it can be seen that one principal object of this invention is to provide an ornamental necklace as a part of a fish care media in which a live fish can be displayed in a small aquariumlike bowl and in which air will freely enter the bowl.

Another principal object of this invention is to provide a means for handling small and slippery fish which ordinarily requires grasping with such pressure that a fish is ordinarily fatally injured.

Another object of this invention is to provide an ornamental necklace especially adapted to permit the user to insert an ornamental fish into a bowl and especially adapted to cooperate with a breathing tower by which the bowl is attached to a necklace chain or string and at the same time permits easy, safe insertion and removal of a fish.

Still another object of this invention is to provide an ornamental necklace having a funnel type net useable in connection therewith which is provided with perforations arranged to allow the fish to be contained in the funnel and in water at all times and be physically inserted in the bowl.

Still another object of this invention is to provide a net generally of funnel shape with a perforated conical top with a detachable handle and a removable plug which enables the entire device to be conveniently shipped and conveniently used.

Still another object of this invention is to provide a net having a removable plug which will permit the user to net a fish from an aquarium when the plug is in place and easily insert the fish held in the net into a container.

A BRIEF DESCRIPTION OF THE DRAWINGS

FIG. 1 is a vertical view, partly in section, of the necklace, constructed in accordance with the teachings of this invention, completely assembled and ready for wear;

FIG. 2 is a vertical partial enlarged view of the breathing tower and showing in detail its cooperation with the necklace bowl attached ready for wear;

FIG. 3 is a vertical view, partially in section and partially in phantom, showing the net with its closure plug and the detachable handle in place;

FIG. 4 is an enlarged sectional view of the tube portion of the net with the closure plug in place; and FIG. 5 is a view taken along line 5—5 of FIG. 3 showing connection between the net and its handle.

SPECIFICATION

The figures in the drawings disclose the fish care and handling media comprising a necklace bowl 10 with a breathing tower 12 attached thereto and provided with a swivel connection 14 for attaching the necklace bowl to a chain 16 to complete a necklace.

Necklace bowl 10 is a relatively thin walled, hollow, substantially spherical shaped container and formed of clear plastic material. Necklace bowl 10 is formed with a flattened bottom surface 18 to permit the bowl to be self supporting on a flat surface and a relatively large opening 20 at the top thereof to receive a neck portion 22 of the breathing tower 12. The opening 20 is so constructed and arranged to permit free access to the inside of the bowl and is provided with an inwardly extending bead 24 (shown more clearly in the enlarged view FIG. 2).

Breathing tower 12 is hollow, bell shaped, and also formed of flexible plastic material with a relatively thin walled neck portion 22 extending therefrom for insertion into the opening 20. The outer surface of the neck portion 22 is provided with a peripheral groove 26 to cooperate with the bead 24 in the opening 20 of the bowl to form part of the snap-on, snap-off attachment to the bowl.

In FIG. 2 where the breathing tower 12 and the spherical bowl 10 is shown enlarged and broken away, it can be seen that the rim 30 of the bowl adjacent the opening 20 is thicker than the rest of the bowl's sidewall to strengthen the opening 20 and to function as a stop for shoulder 32 on the breathing tower as the neck portion 22 is inserted into the opening. In this FIG. it also can be seen that the breathing tower is provided with a plurality of slots, directed along the longitudinal axis of the tower (one such slot 34 being shown in this FIG.). When neck portion 22 is inserted into the necklace bowl, the slots 34 extend a distance above the opening 20 and thus provide openings (one shown at 36) above the top of the bowl to permit air to enter the bowl. These slots 34 also perform another function in that they allow the neck portion 22 to constrict, by flexing, as it is inserted into the opening 20 to facilitate such insertion and, of course, the memory characteristics of the plastic will cause the neck portion to snap back into its original shape when the groove 26 is adjacent the bead 24. This forms the snap-on, snap-off attachment of the breathing tower to the bowl.

These slots 34 also perform another function in that they permit the ready removal of the breathing tower from the injection mold in which it is manufactured.

The top of the breathing tower is provided with a hole 38 into which is inserted the swivel 14. Swivel 14 has a reduced neck 40 and enlarged end 42 which forms an insertable attachment to the breathing tower.

As herein above stated, two of the problems in the prior art solved by this invention are the facility with which the fish can be inserted in the bowl and removed therefrom without injury and the open communication of the bowl with the surrounding air. From the foregoing it can be seen that this invention solved the problem of inserting and removing the fish by the size of the opening 20 and the openings 36 form the air communication when the breathing tower is attached to the bowl.

How this easy removal and insertion of the fish is accomplished in cooperation with a net 50 will now be described.

Turning now to FIG. 3, it can be seen that the necklace bowl 10 is in a position where a fish could be inserted therein by means of net 50. This net comprises a funnel with a conically shaped relatively thin wall portion 62 of flexible plastic material and tube portion 54. The size of tube 54 is so constructed and arranged to permit the easy insertion and removal to and from the bowl yet the passageway 56 permits a fish to readily pass through once the closure plug 58 is removed. The conical portion 52 of the funnel is provided with a plurality of apertures 60 spaced near the top leaving the lower portion of the bowl impervious as at 62. The apertures permit the conical portion 52 to operate as a net so as to scoop or net a fish within an aquarium yet the impervious portion 62 provides a means of containing a fish and a certain amount of water so that the fish never leaves the water from the aquarium to the bowl 10 and will remain alive while working with or cleaning the bowl.

The net includes the manually operable closure plug 58 having a handle portion 64 and an enlarged plug portion 66. The plug portion 66 is provided with an enlarged rim which acts as a stop for the closure plug when it is in position in the funnel 50. As mentioned hereinabove, this closure plug 58 functions to close the opening from the net while the net is being used as such and when a fish is in the funnel 50, handle 64 permits the plug's removal so that the contents therein can be dropped, so to speak, in the bowl.

It is to be noted also that the conical side wall portion 52 of the net is provided with a rectangular slot 68 to receive a diagonal groove 70 in a removable handle 72 (only partially shown) which may be inserted into the slot as shown more clearly in FIG. 5. The flexible plastic material, being deformable and having a memory, permits the ready insertion of the handle into the slot as shown in this FIG.

From the foregoing it can be seen that there is provided a necklace in which a live and swimming fish can be worn as a necklace.

The necklace is made ready for wearing generally as follows:

The necklace bowl 10 is placed on a table or other flat surface (the flattened portion 18 permitting the bowl to remain upright), and the bowl is partially filled with water, the handle 72 is inserted in the rectangular slot 68 and the closure plug 58 is placed in the net 50. With the net used as if it were a conventional fishnet, a fish may be netted from the aquarium. Once the fish is scooped into the conical portion 52, the depending tube 54 may be placed into the opening 20 and the closure plug then removed whereupon the fish and the remaining water in the conical portion are readily dropped into the bowl. If desirable, immediately prior to removing the closure plug, the water in the funnel portion may be removed by tipping the funnel so that little or no water is dropped into the bowl, a feature which is important if the water in the bowl has been previously colored. This prevents dilution of the color. Thereafter, the breathing tower with its swivel 14 already attached can be snapped into place, such as shown in FIGS. 1 and 2. When it is desired to remove the fish and water from the bowl, it is simply a matter of removably snapping the breathing tower out of the opening. If at any time the water is to be changed in the bowl, the net may be used to catch the fish so that the water can be changed without mixing with the reinsertion of the fish.

I claim:

1. A fish care and handling apparatus comprising in combination a necklace including:
   a relatively hollow, thin, substantially spherical clear plastic bowl to display a living fish swimming in water;
   opening means on said bowl so constructed and arranged to facilitate removal of the fish and water;
   a bell shaped breathing tower having a neck portion shaped to be insertable in the opening;
   connecting means on said breathing tower for cooperating with said opening to form a snap-on, snap-off connection therewith;
   said breathing tower also having means for permitting air to freely enter said bowl when said breathing tower is connected thereto; and
   means on said breathing tower for connecting said tower to a necklace chain.

2. The combination claimed in claim 1 wherein said necklace bowl has a bead circumferentially of said opening, a spherical groove on said breathing tower operable with said bead to form a snap-on, snap-off connection therewith, and longitudinal slots in said breathing tower long enough to extend above and below the opening in said necklace bowl when the breathing tower is connected thereto to permit air to freely enter said bowl without allowing water to flow therethrough.

3. The combination claimed in claim 2 wherein said slots further permit said breathing tower to be removed from a forming mold.

4. The combination claimed in claim 1 wherein said fish care and handling apparatus further includes a net comprising:
   a conically shaped bowl and a depending tube portion, the latter being insertable in the opening of said necklace bowl;
   apertures in said conical portion in the upper end thereof to form a lower impervious section near the depending bowl; and
   a closure plug insertable in said tube to close said conical portion to form a container within which a fish may be contained and removable so that the fish may flow through the tube.